United States Patent
Schmitt et al.

(10) Patent No.: US 6,564,138 B1
(45) Date of Patent: May 13, 2003

(54) METHOD AND DEVICE FOR TRACTION CONTROL (TCS) OF A MOTOR VEHICLE AS A FUNCTION OF RADIUS OF CURVE AND TRANSVERSE ACCELERATION

(75) Inventors: Johannes Schmitt, Markgroeningen (DE); Thomas Sauter, Remseck (DE); Andreas Zoebele, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/890,834
(22) PCT Filed: Oct. 20, 2000
(86) PCT No.: PCT/DE00/03691
§ 371 (c)(1), (2), (4) Date: Jan. 14, 2002
(87) PCT Pub. No.: WO01/42039
PCT Pub. Date: Jun. 14, 2001

(30) Foreign Application Priority Data

Dec. 7, 1999 (DE) .................................. 199 58 772

(51) Int. Cl.$^7$ .............................. B60K 28/16; B60T 8/00
(52) U.S. Cl. ............................ 701/82; 701/90; 180/197
(58) Field of Search ...................... 701/82, 90, 72; 303/139, 140; 180/197

(56) References Cited

U.S. PATENT DOCUMENTS

| | | | | |
|---|---|---|---|---|
| 4,933,856 A | * | 6/1990 | Leiber | 180/197 |
| 4,976,330 A | * | 12/1990 | Matsumoto | 180/197 |
| 5,272,636 A | * | 12/1993 | Buschmann et al. | 303/140 |
| 5,328,255 A | * | 7/1994 | Isella | 180/197 |
| 5,488,557 A | | 1/1996 | Matsuda | |
| 5,685,618 A | * | 11/1997 | Uchida et al. | 303/146 |
| 5,980,000 A | * | 11/1999 | Kolbe et al. | 303/139 |

FOREIGN PATENT DOCUMENTS

| | | |
|---|---|---|
| DE | 35 45 716 | 6/1987 |
| DE | 35 46 571 | 10/1987 |
| DE | 199 07 633 | 10/1999 |
| EP | 0 694 464 | 1/1996 |
| EP | 0 844 129 | 5/1998 |

* cited by examiner

Primary Examiner—Michael J. Zanelli
(74) Attorney, Agent, or Firm—Kenyon & Kenyon

(57) ABSTRACT

A method and a device, respectively, for providing traction control of a motor vehicle in which the slip of the driven wheel of the motor vehicle on the inside of the curve is only regulated when its slip exceeds a predefined slip threshold. The predefined slip threshold is weighted with a weighting factor as a function in dependence on the occurring transverse acceleration, and in this connection, the weighting factor is given by an equation as being inversely proportional to the radius of curve of the road.

10 Claims, 1 Drawing Sheet

METHOD AND DEVICE FOR TRACTION CONTROL (TCS) OF A MOTOR VEHICLE AS A FUNCTION OF RADIUS OF CURVE AND TRANSVERSE ACCELERATION

FIELD OF THE INVENTION

The present invention relates to a method and a device, respectively, for providing traction control of a motor vehicle.

BACKGROUND INFORMATION

In German Published Patent Application No. 35 45 716 is discussed a device for propulsion control of motor vehicles, in which, for the purpose of preventing undesired spinning of driven vehicle wheels (slip) they are braked, or rather their drive torque is reduced, when a predefined threshold value of slip (slip threshold) is exceeded. For this purpose, a plurality of slip thresholds are predefined which take effect as a function of transverse acceleration and vehicle speed. Thus, for example, the transverse acceleration is measured by a cornering recognition device, and from this a value is derived for the reduction of the initial drive torque if only one wheel spins, and there is either low transverse acceleration and high vehicle speed or high transverse acceleration and low vehicle speed.

Conditional upon the definitively predefined slip thresholds, it may be that, to a great extent, traction control can be performed, but adjusting and optimizing for the actual curve shape of the road may only be possible to some extent.

SUMMARY OF THE INVENTION

An exemplary method and/or exemplary embodiment according to the present invention is believed to have the advantage that the threshold value for slip in the transverse direction to the vehicle is determined as a function of the radius of curve of the road. During cornering, the drive axle wheel on the inside of the curve is unloaded comparatively greatly, so that it has a greater slip value than the wheel on the outside of the curve. Definitively predefined thresholds here may have the disadvantage that the wheel on the inside of the curve reaches the definitively predefined slip threshold earlier than desired than the wheel at the outside of the curve. Of necessity this may then have the result that the drive torque is reduced too early, in spite of the fact that this wheel with regard to its slip is not critical as to safety. It is therefore considered an advantage not to predefine the slip threshold definitively but adapted to the shape of the road as a function of the radius of curve.

It is also believed to be advantageous that, in addition to the slip threshold, the transverse acceleration of the vehicle, possibly that of the "middle axle", is considered, since the transverse acceleration, besides the radius of curve, also represents a measure of traction reserve.

By the additional measurement of the travel speed, it is believed that the slip value may be advantageously determined in a simple way for individual wheels, without great effort.

It is also believed to be advantageous that the slip threshold is determined as a function of the curve direction, because this allows the assignment of the transverse acceleration to the corresponding wheel on the inside of the curve.

It is also believed to be advantageous that the control system determines a weighting factor for ascertaining the slip. Thereby street conditions, such as country roads of different categories or expressways having different properties with respect to drivability can be better considered.

The dependence of the weighting factor as a straight line function may be provided using a software program, and should not require major storage.

By increasing the slip threshold for the wheel on the inside of the curve which is engine-driven, higher travel speeds should result without the vehicle's becoming unstable or reaching a condition critical as to safety. Weighting, using the weighting factor, here represents a way of adapting the slip threshold linearly to the radius of curve.

Since in sustained curves having a very large radius of curve the risk of a risky driving maneuver may be relatively low, it may be sufficient to limit the slip threshold to a minimum value.

DETAILED DESCRIPTION

Figure 1:
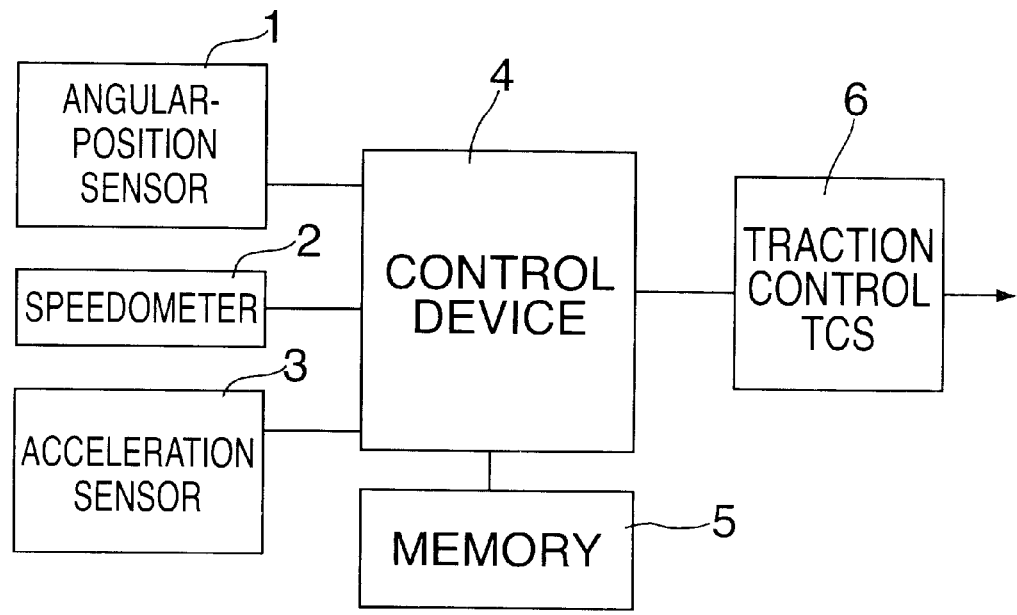
FIG. 1 shows a block diagram of an exemplary device according to the present invention.

The block diagram in FIG. 1 shows a control device 4, in which essentially the threshold value for slip is calculated as a function of radius of curve and optionally of further parameters. Connected to it is a memory 5, in which calculated values, such as updated slip values for the individual wheels, the weighting factor G and other parameters and quantities are stored. To control device 4 there are further connected sensors such as an angular-position sensor 1, a speedometer 2 and/or an acceleration sensor 3 for determining the transverse acceleration. These sensors supply their measuring data to control device 4, and from these, in principle, the yaw rate and the transverse acceleration are calculated. At an output, the calculated slip threshold for each wheel is supplied to traction control TCS 6 already present in the vehicle. This device 6, in turn, has influence either on corresponding actuators for the brakes or for reducing the drive torque.

In another exemplary embodiment, the control device 4 is a component part of the traction control (TCS). Here, control device 4 may include a software program and may be integrated into the control program for the TCS unit 6. The TCS unit 6 with its individual subassemblies such as filter, microcomputer, comparator, memory, etc, may be any suitably appropriate TCS unit and therefore is not further explained here.

Depending on the magnitude of the occurring slip values as compared to the calculated slip thresholds, TCS unit 6 delivers corresponding control signals for activating the individual, separately activatable brake cylinders or for reducing the drive torque of the driving engine. The aim, here, is for the vehicle to have stable tracking even during cornering, without breakaway of the front end or the rear end, and without the vehicle's getting out of the driver's control because of rotation about the yaw axis.

Figure 2:
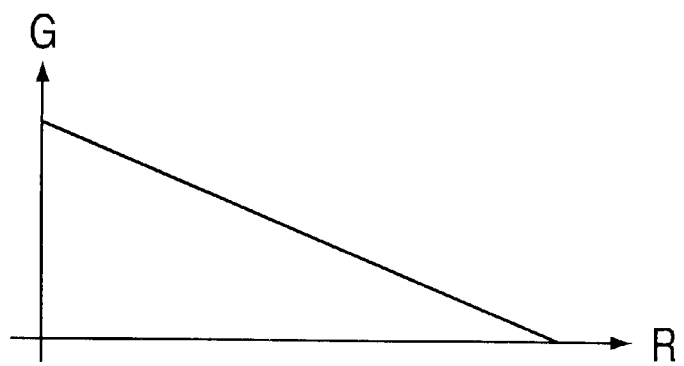
FIG. 2 shows a diagram for determining weighting factor G.

In the following, the functional manner of the exemplary method or the exemplary device is explained in greater detail in consideration of FIG. 2. In traction control (TCS), the object is managed that a drive wheel tending to free spin is braked, so that the less spinning wheel, having correspondingly less slip, can transfer a greater drive torque to the road. Without TCS control, for instance during cornering, situations can arise which can lead to skidding of the vehicle. In such a situation the driver may be overtaxed, and may no longer be able to regain control of the vehicle. In contrast, with the exemplary traction control according to the present invention, when there is recognition of a dangerous situation, when a certain threshold value for slip is exceeded because of increasing transverse acceleration forces of the vehicle, the driven wheel on the inside of the curve may be braked or traction may be limited by reduction of the drive torque of the engine. Thereby, on certain assumptions, the vehicle stabilizes itself automatically, without the driver's having to intervene.

Since during cornering the wheel on the inside of the curve may be greatly unloaded because of the transverse acceleration, a greater slip occurs at this wheel than at the one on the outside of the curve. However, the slip of the wheel on the inside of the curve should not really be relevant and/or significant to safety, since this wheel should assume little or no lateral grip. For this reason, it should not be necessary to reduce the drive torque in every case. It is therefore provided according to the exemplary embodiment and/or exemplary method of the present invention to increase the slip threshold for the driven wheel on the inside of the curve as a function of the transverse acceleration according to the following formula:

$$LAMB\ AY=OFF\ AY+AY\ FAK*AY\ B$$

The new slip threshold LAMB AY thus obtained, which was enlarged by the transverse acceleration AY B, is now weighted with a weighting factor G as a function of the ascertained radius of curve. FIG. 2 shows the weighting function for weighting factor G as a function of radius R of the road curve. The weighting function for weighting factor G is a straight line having a negative slope, developed by the following formula:

$$B\ AY\ RAD=LAMB\ AY*G$$

This formula gives the weighted slip for the driven wheel on the inside of the curve. The weighting factor is evaluated using the formula:

$$G=OFF\ RAD-STEI\ RAD*R$$

The individual factors have the following meaning:

AY is the transverse acceleration;

LAMB AY is the slip threshold offset of a wheel as a function of the transverse acceleration AY;

OFF AY is an offset value (Y-axis section);

AY FAK is the slope of the line equation, and may be preferably evaluated empirically;

LAMB AY RAD is the offset of the slip threshold weighted by the radius of curve;

G is the weighting factor;

OFF RAD is the offset value (Y-axis section), dependent on the radius;

STEI RAD is the slope of the straight line dependent on the radius; and

R is the radius of curve.

Because of the radius-dependent slip LAMB AY RAD the slip threshold is constantly adapted to the instantaneous transverse acceleration of the vehicle or the vehicle speed, and the shape of the road. It is therefore believed that a maximal drive torque can be transferred to the road, without danger of breakaway of the vehicle being a given.

In another exemplary embodiment of the present invention, the control device 4 is connected to TCS unit 6 or an anti-lock braking system ABS, in order to construct the entire driving dynamics concept as simply and as cost-effectively as possible.

What is claimed is:

1. A method for providing traction control for a motor vehicle operating on a curve of a road, the method comprising the steps of:

recording, using at least one sensor, an acceleration in a transverse axis, a driving speed of the motor vehicle, a speed of a wheel and a radius of a curve of a road;

determining a slip value of a wheel from recorded values;

comparing the slip value with a predefined slip threshold;

at least one of braking the wheel on an inside of the curve of the road upon exceeding the predefined slip threshold, and reducing a drive torque of an engine of the motor vehicle to limit a traction of the motor vehicle upon exceeding the predefined slip threshold; and changing the predefined slip threshold for the wheel on the inside of the curve of the road upon exceeding the predefined slip threshold, wherein the predefined slip threshold is determined as a function of the acceleration in the traverse axis according to a straight line equation of LAMB AY=OFF AY+AY FAK*AY, where OFF AY is a constant offset value and AY FAK is a slope parameter for the straight line equation.

2. The method of claim 1, wherein the constant offset value is determined empirically for a vehicle type.

3. The method of claim 1, wherein the slope parameter is determined empirically for a vehicle type.

4. The method of claim 1, wherein the slip threshold is calculated as a function of the radius of the curve of the road according to the following equation: LAMB AY RAD= LAMB AY*G, where LAMB AY RAD is the predefined slip threshold taking into consideration the radius, RAD being the radius, and G a weighting factor G.

5. The method of claim 4, wherein the weighting factor is calculated according to another straight line equation of G=OFF RAD−STEI RAD*RAD, where OFF RAD is a fixed offset value for the radius RAD, STEI RAD is a slope measure for the another straight line equation giving consideration to the radius and the radius RAD is of the radius of the curve of the road.

6. The method of claim 1, wherein a direction of the curve of the road is determined.

7. The method of claim 1, wherein the predefined slip threshold is limited to a minimum value.

8. A device for providing traction control for a motor vehicle, the device comprising:

at least one sensor for recording a transverse acceleration of the motor vehicle, a driving speed and a slip of a wheel;

a control device for providing a slip threshold; and a controlling device for controlling the slip of the wheel on an inside of a curve of a road;

wherein the control device includes an arrangement for determining the slip threshold by increasing the slip threshold as a function of the transverse acceleration of the motor vehicle and by decreasing the slip threshold as a function of a weighted radius of the curve.

9. The device of claim 8, wherein the arrangement for determining the slip threshold includes a software program.

10. The device of claim 8, wherein the device is at least one of a component part of at least one of a higher-level vehicle control unit, a control unit for controlling driving dynamics and an anti-lock braking system.

* * * * *